Patented Aug. 24, 1926.

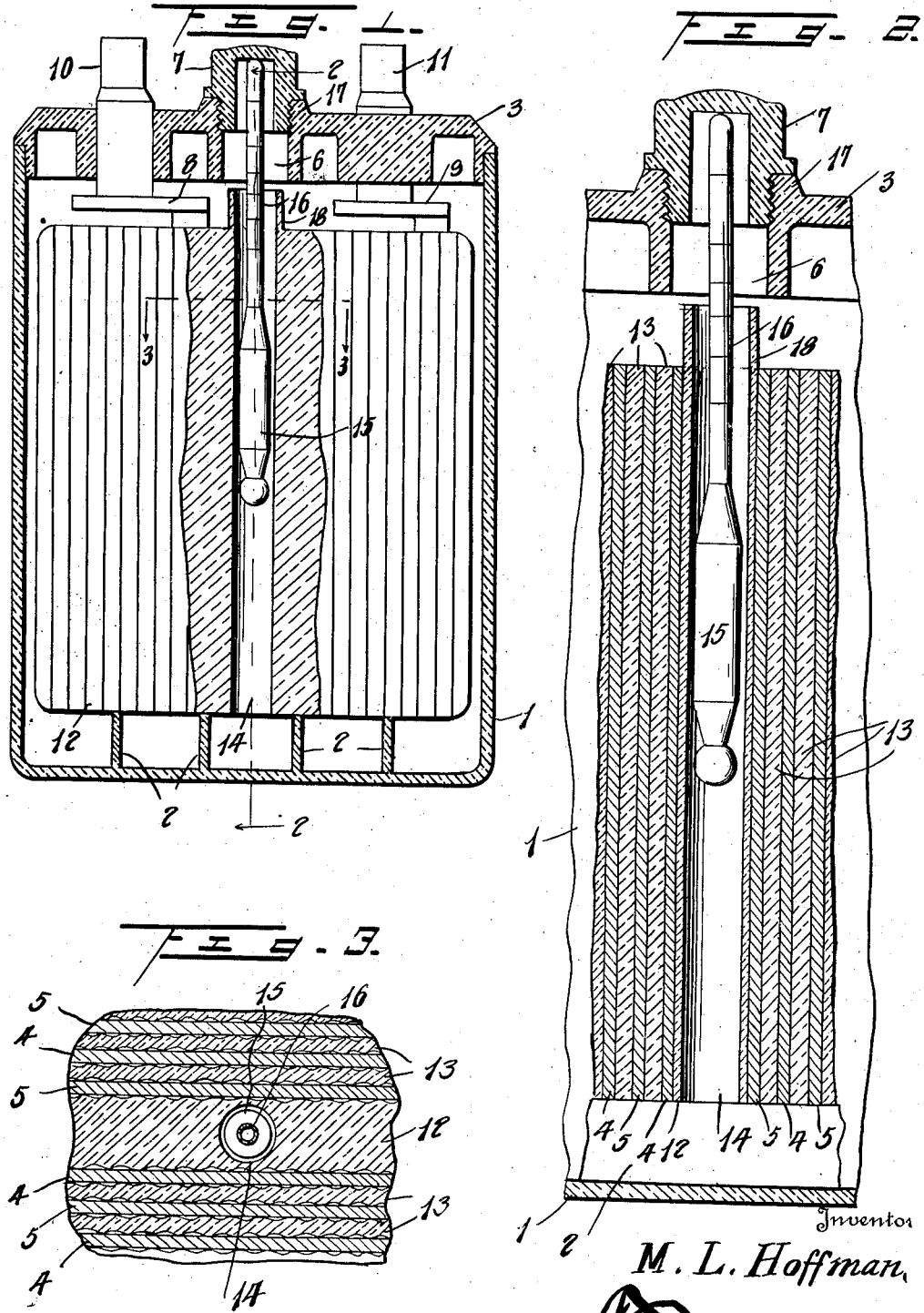

1,597,597

UNITED STATES PATENT OFFICE.

MATHIAS L. HOFFMAN, OF EAST COVENTRY TOWNSHIP, CHESTER COUNTY, PENNSYLVANIA.

STORAGE-BATTERY INDICATOR.

Application filed June 9, 1925. Serial No. 36,007.

This invention relates to storage batteries, and has for one of its objects the provision of novel, simple and inexpensive means through the medium of which the specific gravity of the electrolyte of each cell of a storage battery can be ascertained by merely removing the plugs of the filling openings of the cells.

The foregoing and other objects are attained by the construction, combination and arrangement of parts hereinafter fully described and claimed, and illustrated in the accompanying drawing, wherein:

Figure 1 is a sectional view of a storage battery cell embodying my invention,

Figure 2 is a sectional view on an enlarged scale taken on the plane indicated by the line 2—2 of Figure 1, and Figure 3 is a detail sectional view taken on the plane indicated by the line 3—3 of Figure 1.

Corresponding and like parts are referred to in the following description, and designated in the several views of the accompanying drawing, by similar reference characters.

In the drawing 1 designates the jar, 2 the bridges, 3 the cover, 4 the positive plates and 5 the negative plates of a storage battery cell. The cover 3 is provided with a centrally located filling opening 6 which is closed by a cap 7. The positive plates 4 are connected by a strap 8 and the negative plates 5 by a strap 9 to which straps are secured posts 10 and 11, respectively. The plates 4 and 5 are retained in relatively spaced relation by separators 12 and 13 of which the former occupies a central position in the cell and is thicker than the latter.

In accordance with my invention the central separator 12 is provided with a vertical bore 14 which is arranged in axial alinement with the filling opening 6. A hydrometer is loosely mounted in the bore 14, and is held within the cell by the cap 7. When the cap 7 is removed the upper end of the hydrometer extends through the filling opening 6 for a distance depending solely on the specific gravity of the electrolyte.

From the foregoing description, taken in connection with the accompanying drawing, it will be understood that when it is desired to ascertain the specific gravity of the electrolyte it is only necessary to remove the cap 7, and that on the removal of the cap 7 the hydrometer 15 will rise up through the filling opening 6 for a distance depending solely upon the specific gravity of the electrolyte. It will further be seen that the graduation 16 of the hydrometer 15 registering with the upper edge of the flange 17 formed on the cover 3 about the filling opening 6, indicates the specific gravity of the electrolyte.

The electrolyte must stand at a certain level in the cell in order that an accurate reading of the hydrometer may be obtained. To enable a person to determine whether the electrolyte is at the proper level, a gage or indicator 18 is provided, and it preferably consists of a cylindrical extension on the central separator 12 about the bore 14.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. A storage battery cell having a cover provided with a filling opening and a flange surrounding said opening, a cap for said opening, a separator provided with a bore opening out through the upper and lower edges thereof and axially alined with said opening, and a hydrometer arranged in said bore and retained within the cell by said cap, the graduations on the hydrometer and said flange cooperating on the removal of the cap to enable the specific gravity of the electrolyte of the cell to be determined.

2. A storage battery cell having a cover provided with a filling opening, a cap for said opening, a separator provided with a bore axially alined with said opening and provided at its upper edge with an extension to indicate the proper level of the electrolyte, and a hydrometer arranged in said bore.

3. A storage battery cell having one of the separators thereof provided at its upper edge with an extension to indicate the proper level of the electrolyte.

4. A storage battery cell having a cover provided with a filling opening, a cap for said opening, a separator provided with a bore opening out through the upper and lower edges thereof and axially alined with said opening, a cylindrical extension at the upper edge of the separator and surrounding the bore therein, said extension indicating the proper level of the electrolyte, and a hydrometer arranged in said bore and retained within the cell by the cap.

In testimony whereof I affix my signature.

MATHIAS L. HOFFMAN.